June 12, 1923.
F. W. LANCHESTER
1,458,532
WHEEL AND TIRE FOR ROAD VEHICLES
Filed June 10, 1919    3 Sheets-Sheet 1
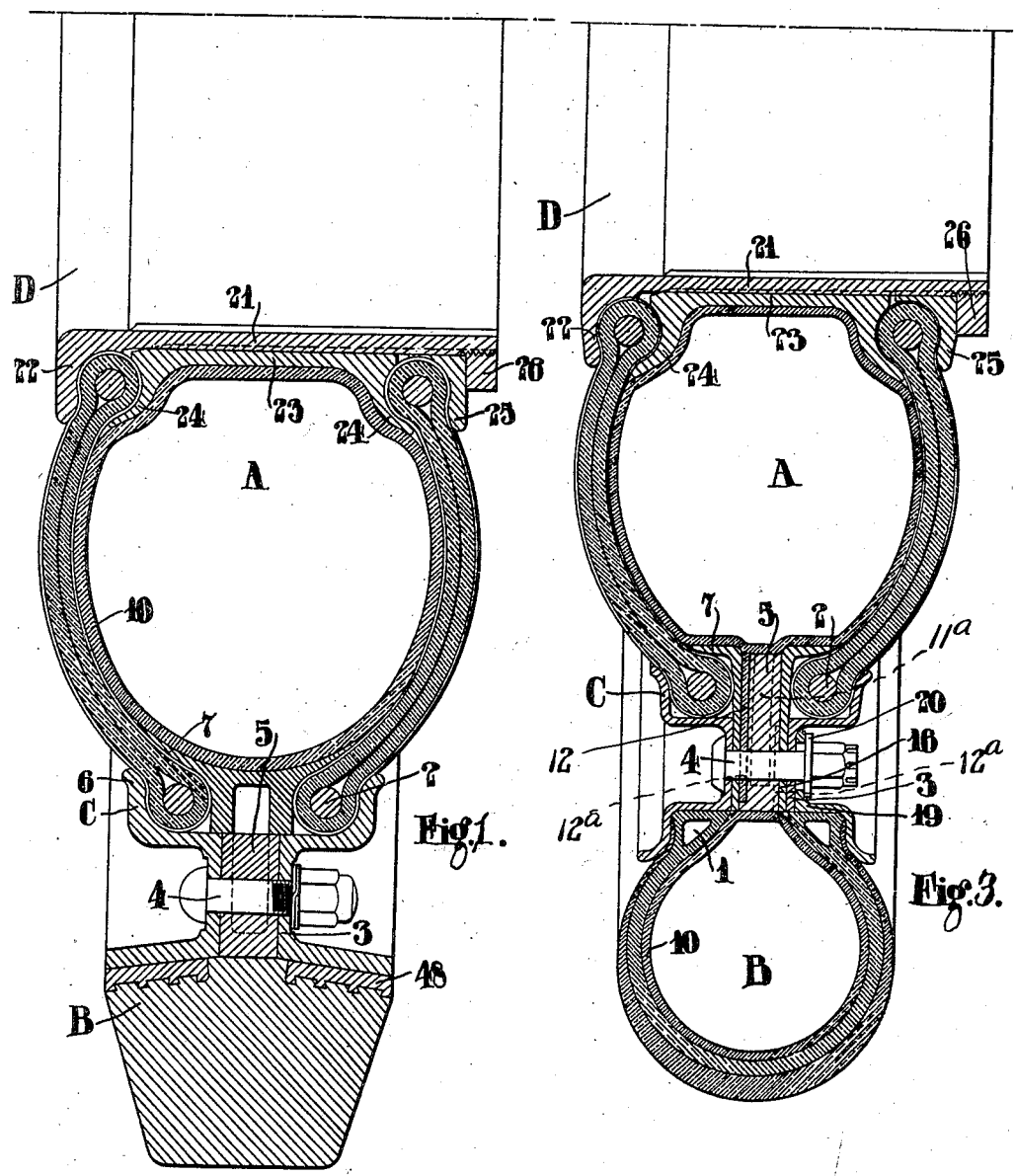
INVENTOR
F. W. LANCHESTER,
BY H. P. Kerslake
ATTORNEY June 12, 1923.
F. W. LANCHESTER
1,458,532
WHEEL AND TIRE FOR ROAD VEHICLES
Filed June 10, 1919 3 Sheets-Sheet 2
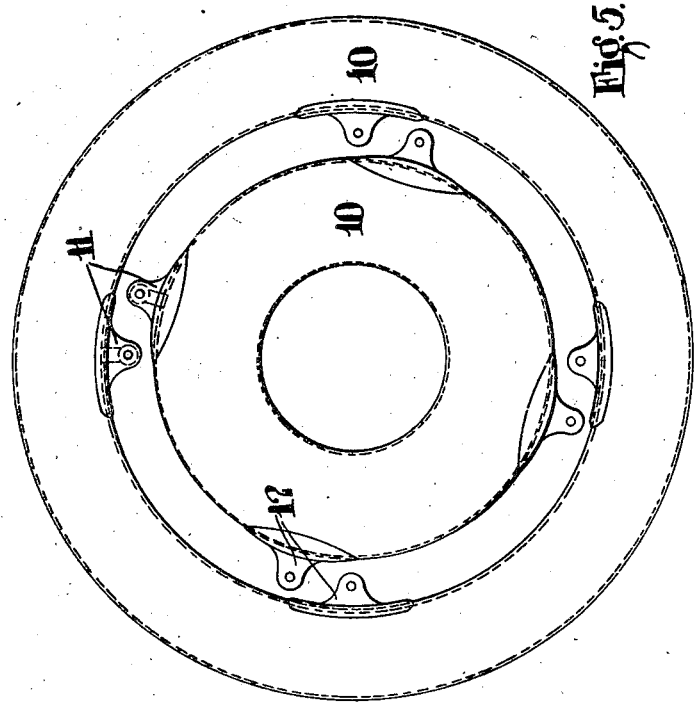
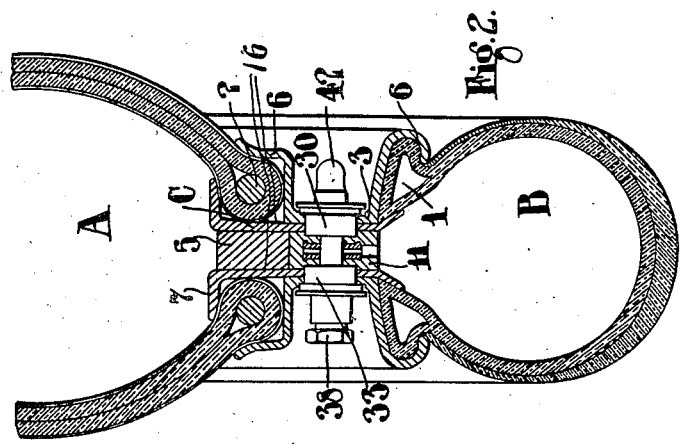
INVENTOR
F.W. LANCHESTER,
BY H.R. Kerslake
ATTORNEY

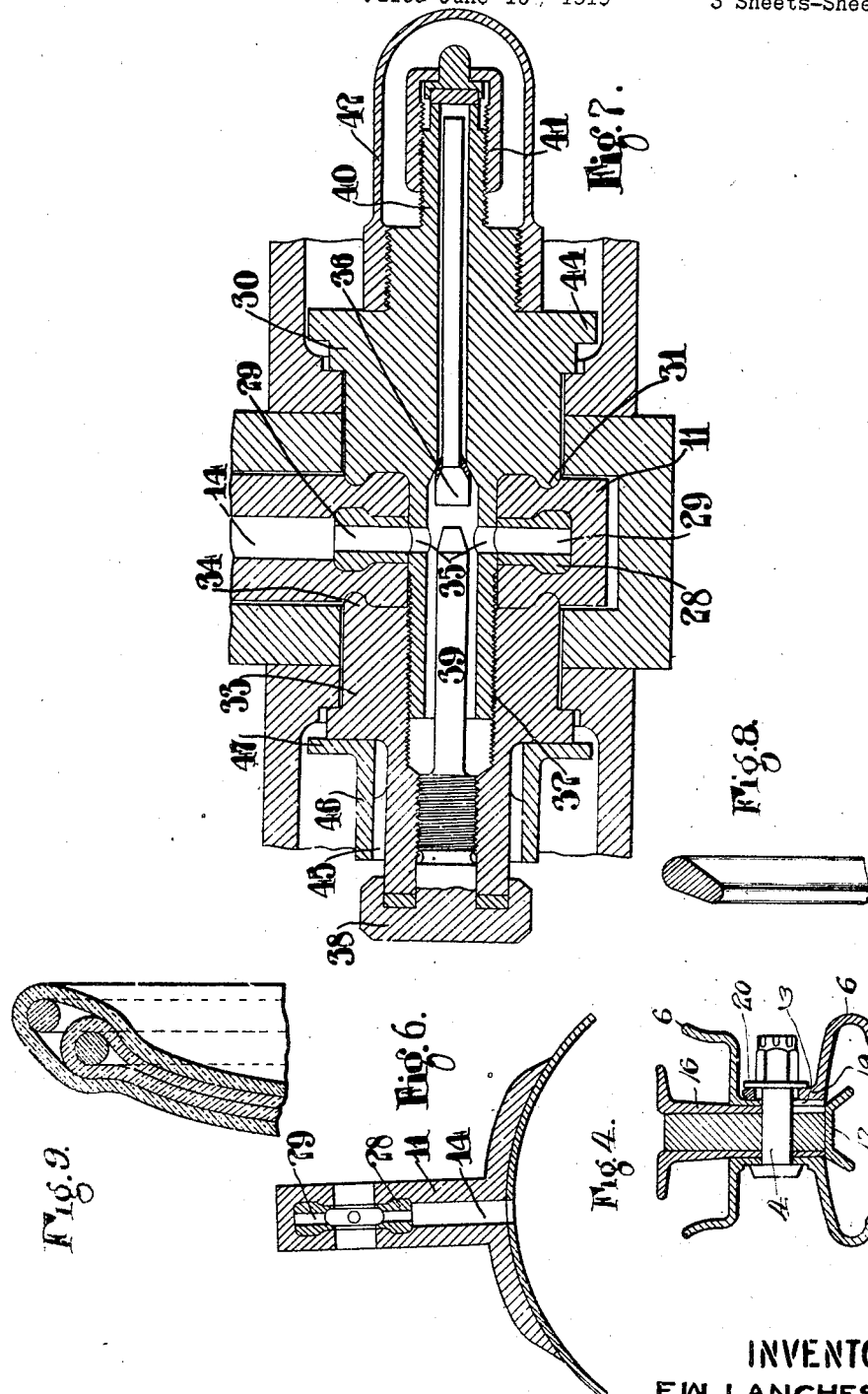

Patented June 12, 1923.

1,458,532

UNITED STATES PATENT OFFICE.

FREDERICK WILLIAM LANCHESTER, OF LONDON, ENGLAND.

WHEEL AND TIRE FOR ROAD VEHICLES.

Application filed June 10, 1919. Serial No. 303,163.

*To all whom it may concern:*

Be it known that I, FREDERICK WILLIAM LANCHESTER, a subject of the King of Great Britain and Ireland, and residing at 41 Bedford Square, London, W. C. 1, England, have invented certain new and useful Improvements in Wheels and Tires for Road Vehicles, of which the following is a specification.

The present invention relates to improvements in tires and wheels for road vehicles, and its object is to provide a resilient wheel possessing such elastic properties that it shall be well adapted for taking shocks, more especially lateral shocks, such as would result in breaking or buckling a wheel of ordinary construction.

The resilient wheel provided by the present invention is of the known type comprising an inner pneumatic element, called hereinafter the "sub-tire," a peripheral element called hereinafter the "tire-proper;" and a nominally rigid element, called hereinafter the "floating rim," forming the coupling or connection between the tire-proper and the sub-tire.

The tire proper may be either pneumatic or "solid." The sub-tire is pneumatic, and is made of such dimension radially and possessing such lateral resilience as to be capable of resisting and absorbing lateral shocks or blows given to the tire proper or to the floating rim, such as would result in breaking or buckling a wheel of ordinary construction. Further, the tire proper, subtire and floating rim will be collectively of such radial dimension that the central part of the wheel is in consequence reduced to little more than the bare hub. The axial distance apart of the mountings of the sub-tire cheeks or covers to the hub and floating rim respectively may be appropriately referred to as the pneumatic bases. In order to provide sufficient lateral stiffness to the resilient wheel, the pneumatic base on the hub is made wider than that on the floating rim.

The elasticity of the sub-tire both radially and laterally contributes appreciably to ameliorate the conditions of running and to diminish the wear and tear of the tire proper.

My invention consists in a radially and laterally resilient wheel without spokes, comprising a hub, a floating rim, a pneumatic sub-tire adapted to be detachably fastened both to the hub and to the floating rim in a manner independent of inflation, and a peripheral tire proper.

The outer cover of the sub-tire is made in two parts, flanges or cheeks. Each flange has its outer margin or edge adapted for attachment to the floating rim by means hereinafter described, and its inner margin or edge adapted for attachment to the hub of the wheel, or to a sleeve member, detachably fastened to the hub. Thus the sleeve member, sub-tire, floating rim, and tire proper constitute a detachable assemblage corresponding to the detachable wheel in present day use.

The floating rim comprises two side elements called hereinafter "clinches," and an intermediate or distancing element called hereinafter the "packing piece" and which comprises "counter clinches." These elements are fastened together in fixed relationship by a number of through bolts when the margins of the tire proper and sub-tire are assembled in their appropriate relationship thereto. The floating rim can be adapted so that the tire proper may be dismounted when desired without disturbing the subtire.

The two half covers or cheeks are constructed of cotton cord or canvas and vulcanized rubber in a well known manner and are comparatively inextensible. The outer margins of the cheeks are furnished with incompressible bands or hoops, and are located between the clinches and counter-clinches of the floating rim in such manner that the incompressible band or hoop cannot buckle either radially or laterally. The inner margins may be either of the wired or beaded edge types, preferably the former, and are fastened to the sleeve member or to the central part of the wheel by means comprising clinches and counter clinches which function in the same manner as those of the floating rim above described.

The clinches and counter clinches are so shaped that they prevent the parting of the two layers of fabric (when subjected to tension due to inflation pressure) along the line where the two layers come into juxta-position in the vicinity of the inextensible and incompressible bands or hoops. This method of fastening the inextensible wired edges or margins affords double security, since even if the wires could extend under excessive tension, the thickened margins cannot pass through the constricted annular spaces between the clinches and counter clinches.

When the tire proper is of solid rubber the outer clinches of the rim are flanged to conical form, the seat of the solid tire being a double cone of comparatively small taper so that when the clinches are pulled home by the bolts, the tire proper is firmly gripped. In order to prevent the tire proper expanding under the pressure of the conical seating surface, it is furnished with an inextensible steel foundation band, or it may be two such bands, vulcanized in or to its substance, as is the common practice in the case of solid tires with a parallel seating.

Pockets are arranged in the packing piece of the floating rim, to receive lugs protruding from the inner tube of the sub-tire and that of the tire proper when the latter is pneumatic. One of the lugs of each inner tube is adapted to receive the valve, this being fitted with its axis transverse to the wheel. Other lugs may be provided to serve as anchorages for the inner tubes additional to those provided at the valve positions. The valve lugs are furnished with the necessary air ducts to communicate with the air chamber.

I append drawings illustrative of my invention as applied in a few typical forms of resilient wheels each detachable as a whole, the hubs of the wheels not being shown in the drawings.

Figures 1–3 are radial transverse sections of detachable wheels adapted for mounting direct on the hub, the sub-tires being made each with two half covers or cheeks. Figure 1 shows a solid tire-proper. Figures 2 and 3 show pneumatic tires proper, Figure 2 a British beaded edge type, and Figure 3 an American wired edge type.

Figure 4 is a lateral section of the floating rim adapted for dismounting the tire proper without disturbing the sub-tire.

Figure 5 is an elevation showing the inner tubes of a pneumatic tire proper and the sub-tire in relative position, together with the lugs for the valve and for anchorage.

Figure 6 is a lateral section of a lug adapted to receive the valve.

Figure 7 is a sectional view of a valve suitable for use with the present invention. The valve is shown in elevation in Figure 2.

Figures 8 and 9 relate to details of the tire margins.

In the various drawings, A is the sub-tire, B the tire proper, C the floating rim, and D the sleeve element, adapted to be detachably fastened to the hub.

The margins of the outer cover of the tire proper, when pneumatic, are beaded at 1, (Fig. 2) or alternatively supplied with wired inextensible edges 1 (Fig. 3) in the usual manner. The outer edges 2 of the sub-tire are similarly beaded or preferably wired, but in this case the alternative of an inextensible edge is not available.

The floating rim C consists of three members, viz: two external ring members 3 with clinches 6 connected by a number of through bolts 4, some 20 or 30 bolts being ordinarily required, and one internal member or ring 5 forming a distance or packing piece between the two external members aforesaid. The external members 3 are furnished with the usual turnover or abutment lips 6 by which the beads or edges of the tire proper and of the covering member of the sub-tire are secured, and the packing piece may be provided with counter clinches or abutments 7 to secure the tire proper and the sub-tire from becoming detached in the event of puncture or deflation.

The tire proper and the sub-tire are furnished with inner tubes 10 in the usual manner, and for the purposes of inflation these inner tubes are provided with lugs 11 projecting into recesses or gaps 11ª formed in the packing piece 5. The inner tubes may be further fitted with lugs 12 formed of rubber vulcanized integral with the tube itself, these lugs being similarly accommodated in pockets or recesses 12ª in the packing piece 5, and the said lugs may be perforated to receive each a bolt or pin 4 to form a definite location or anchorage for the inner tube at a sufficient number of points to prevent it creeping. The valve lug 11 aforesaid resembles externally one of the lugs 12 as described, but has within it a flat recess 14 communicating with the interior of the tube, and within this recess may be inserted the head of a valve connection of the usual type, the axis of which is at right angles to the plane of the wheel and may be arranged in a position centrally between two of the rim construction bolts projecting laterally for a sufficient distance to be convenient for inflation. The provision of valves for both the inner tube of the tire proper and that of the sub-tire is similarly arranged. The valve shown in the drawings is described hereinafter and is claimed in my concurrent British Patent No. 303,164.

The packing piece 5 of the floating rim may be conveniently constructed of aluminium or of wood or fibre, and requires to be of sufficient thickness to contain the valve lug. It may consist of a simple turned ring of aluminium or fibre of rectangular section suitably drilled for the rim construction bolts, and is notched at points either coincident with or in between the bolt holes alternately internally and externally to receive the valve and anchorage lugs on the inner tube of the sub-tire and tire proper respectively. The said anchorage lugs are not absolutely necessary and should not be as numerous as the construction bolts, some four or five lugs, including that for the valve, being in any case sufficient for each of the two inner tubes.

The interior abutments or counter clinches 7 to more fully secure the margins of the outer covers may when the packing piece is of metal conveniently take the form of flanges projecting from the corners of the rectangular sections aforesaid, these flanges forming an angle with one another and with the central portion of the section as in the security bolts of an ordinary pneumatic tire. In Figure 1 the pair of counter clinches 7 for the outer margins of the sub-tire are made in a one-piece ring or "rimlet" separate from the packing piece 5. In Figure 2 the counter clinches 7 for the outer margins of the sub-tire and the inner margins of the tire proper are made in two pressed steel rings 16 located one at each side of the packing piece 5, and each ring comprises a counter clinch for the sub-tire and one for the tire proper. In Figures 3 and 4 each ring 16 has a clinch for the sub-tire only. In Figure 3 no counter clinches are shown for the tire proper, while in Figure 4 the two counter clinches for the tire proper are shown integral with a separate pressed steel ring or rimlet 17.

The external ring members 3 comprising the clinches of the floating rim are conveniently made of steel rings pressed from sheets of an appropriate thickness (commonly about ⅛ inch).

When it is desired to permit of the tire proper being removed and replaced without disturbing or deflating the sub-tire, one at least of the external ring members 3 is made in two portions, as shown in Figures 3 and 4. The outer clinch appropriate to the tire proper is in the form of a separate ring comprising a flange 19 extending radially inwards, and the inner clinch securing the sub-tire cover being integral with the ring or flange 3 extending radially outwards. The flanges 3 and 19 of the two rings overlap, and the construction bolts pass through both; the flange 3 of the inner clinch (carrying the sub-tire) takes its place next the packing piece 5 and the outer flange 19 is superposed thereon. The bolt holes in the flange 19 are made of such diameter as will pass over the nuts, and to enable the nuts to hold the outer clinch, washers 20 of large diameter are provided.

When it is desired to dismount the tire proper without disturbing the sub-tire the nuts are taken from the construction bolts one at a time, the washer is removed and the nut replaced, the bolt in question then serves to hold the inner clinch securely but does not affect the outer clinch. When the whole of the nuts have been so treated the outer clinch and the tire proper can be removed and the tire repaired and replaced, or the inner tube may be changed. The process is then reversed, the large diameter washers 20 being replaced one by one. It is not necessary that all the bolt holes in the outer clinch should be of the large size, since it is sufficient to replace a part of the total number only in order to effectively secure the sub-tire.

In the cases of tires having the wired-on edge the tire is freely removable when one of the clinches has been detached as aforesaid, but in the case of the tire with a beaded edge it is sometimes desirable to have an equivalent for the usual security bolt. This as already described conveniently takes the form of a light rim or rimlet 17 (Figure 4) of trough section adapted to take its place between the beaded edges when the tire is in place, the inextensibility of the rimlet serving to prevent any possibility of the outer cover coming off on the road even when deflated.

The sub-tire edges may be conveniently constructed on the inextensible and incompressible plan, that is, the inner and outer edges respectively, but the strength necessary being considerable the fabric or cord, which is taken round the inextensible or incompressible hoops, requires to be held together locally to prevent its separating under tension and leading to the disruption of the structure. To this end the exterior clinches by which both edges are secured are made of considerable strength and the counter-clinches furnished internally are also of ample strength, the tire structure being gripped between the lips of the clinch and counter clinch in such manner as to prevent any tendency for the two layers to become separated.

In the preferred form of sub-tire with the outer cover made in two parts, the inner margins are secured by means analogous to those used for securing the margins of the sub-tire and tire proper to the floating rim. The outer or resilient part of the wheel is preferably constructed in such manner that it may be fastened to or detached from the hub without deflating its sub-tire. In this case, the sleeve element D comprises a sleeve 21 (Figure 3) provided with a flange or clinch 22 at one end, a distance or packing tube 23 provided with flanges or counter clinches 24 castellated or otherwise suitably mounted on the sleeve 21 so that it is slidable thereon but cannot turn relative thereto, and a loose flange or clinch ring 25 similarly mounted on the sleeve 21. When the said parts are assembled together with the inner margins of the sub-tire in their appropriate relationship, they are secured in position by a ring nut 26 screwed on the end of the sleeve 21 remote from the clinch 22, or by a flange and bolts.

For the incompressible band at the outer margin of the sub-tire it is necessary to secure great rigidity. The section of hoop preferable under these conditions is one of elongated form whose axis of section lies in the direction of the tension force. A turned or accurately rolled steel band of oval or pear-shaped form of section (Figure 8), filling naturally the pocket formed by the fold of the canvas or loop on the return of the cord, is appropriate. However, a simple hoop of circular cross section, in conjunction with clinches and counter-clinches of sufficient stiffness, as shown in Figures 1, 2 and 3, may be employed.

The inextensible band at the inner margin may be formed either as a single hoop of circular or other convenient section, or of a single long length of high tension wire coiled to form a stranded hoop, the two ends being appropriately connected or anchored, or as a spliced cable or grummet. In the case of heavy vehicles where the forces on the tire structure are considerable, the inextensible member at the inner edge of the sub-tire cheek may be made multiple, that is to say, two or more hoops may be furnished one within the other in place of the single hoop and an inner layer of canvas may be looped over the outer hoop element and a second layer over a second hoop element and so on, as shown in Figure 9.

The inner tube of the tire comprises the radially projecting lug 11 adapted to take its place in and fill the pocket hereinbefore described. This lug is conveniently made as a separate moulded piece of vulcanized rubber of somewhat harder quality than the tube itself; the lug proper forms a protuberance on and forms one with a patch conveniently of oval form by which an adequate connection between the lug and the inner tube is obtained. The interior of the lug communicates by the duct 14 with the air chamber of the inner tube. Within it is a metal ring or washer 28 bored axially and drilled radially at several points 29, so as to provide air ducts from its bore to its periphery. The wall or walls of the lug are pierced to receive the valve body corresponding to the central hole of the washer; the holes pierced in the lug, the drilled holes in the valve box and the central hole of the washer are arranged to register when the inner tube is fitted in position.

The method of assemblage of the tire shown in Figure 2 is as follows:—One of the ring members 3 of the floating rim is furnished with the construction bolts in position and mounted on a supporting ring on the bench, the supporting ring bearing on the bolt heads. The sleeve D is also placed with its flange 21 resting on the supporting ring concentric with the ring 3. The lower sub-tire cheek and the outer cover of the tire proper are then laid in position with their lower margins resting in the abutment lips of the said ring 3, the inner margin of the sub-tire cheek being passed over the sleeve D to rest on the flange thereof. The internal member 5 of the floating rim is then threaded over the bolts and passed down into the interior of the tire proper, so that its counter clinches bear evenly on the lower margins of the outer covers of the sub-tire and tire proper. The distance sleeve 23 is placed on the sleeve. The inner tubes are then inserted, and the lugs are pushed into their recesses in the internal member 5, the positions of the lugs being clearly visible from above; the valve lug with the valve shank or body also is placed in position, the valve shank projecting upwards. The upper cheek of the sub-tire and the upper margin of the outer cover of the tire proper are now placed in position, and the remaining ring 3 is threaded over the bolts and valve body, its abutment lips or clinches taking their correct positions over the upper margins of the tire proper and sub-tire respectively. The nuts are now threaded on the bolts, tightened up, and where and if the inner tube lugs have been provided with perforations, additional bolts are passed through holes in the outer rim members arranged to register with these. The loose flange 25 is placed on the sleeve D and the ring nut 26 is screwed up. The sub-tire and tire-proper are now ready for inflation, which is done in the usual manner. The method of assemblage of the various modifications is analogous to that described.

As an alternative to a valve and body of the usual type, the valve body is constructed in two parts. The seat portion 30 carrying within it a valve 36 of known type is provided with a face 31 and a spigot 32 of such diameter as to approximately fit the hole in the lug; the end of the spigot is screwed and projects beyond the lug when the valve seat portion is in place. The other portion 33 of the valve body, which will be referred to as the "counterpart," is screwed on internally to fit the spigot and is provided with a face 34 so that when the seat portion and the counterpart are screwed together, the lug of the inner tube is hermetically secured between the two faces, the internal washer or ring of the lug taking the pressure from wall to wall. The spigot is drilled radially at 35 to correspond with the holes drilled radially in the ring or washer 28, so that free air communication is provided between the interior of the valve body and the air chamber of the inner tube. In one form of construction the valve 36 is inserted through the counterpart 33 in its correct position in relation to its seat, a cap 38 is provided to be screwed on to the counterpart to make an airtight joint, and a central spigot 39 from the said cap serves to limit the movement permitted to the valve. The seat portion of the valve body is provided with the usual screwed termination 40 for the attachment of the inflator and with the customary stop cap 41 and dust cap 42.

To prevent the seat portion and the counterpart from unscrewing, the seat portion is provided at 44 with a flange of square or other suitable shape adapted to prevent its rotation, the screwing together being effected by turning the counterpart. The counterpart is fluted or otherwise shaped at 45 in such manner as to receive a locking washer 46 which cannot turn relative thereto, the periphery of the locking washer at 47 being of such shape as will prevent its rotation. The locking washer is retained axially in place by the head of the cap 38 aforesaid.

The holes drilled in the flat walls of the pocket in the packing piece are of such diameter as will admit the valve body faces, namely the face of the seat portion on the one hand and of the counterpart on the other, so that the valve body may be wholly unscrewed and removed when demounting the tire. External nuts and rubber washers may be provided to prevent the admission of mud or dust the said nuts and rubber washers fitting externally to the seat portion and counterpart respectively.

In a modification, in place of the radially drilled metal ring or washer aforesaid the lug may be made of solid rubber but of sufficiently hard constitution or with a sufficiently hard core to allow of an air passage being drilled through its substance from the air chamber of the inner tube to the valve body aperture without risk of collapsing under the pressure of the valve body flanges. Alternatively, the rubber itself may not be of sufficient hardness but the hole in question may be moulded in the lug piece and lined with a metal tube in order to prevent its collapse.

As stated, the tire proper may be either of the solid or pneumatic variety. When a solid tire is used (Figure 1) the outer flanges of the clinches are made of conical forms, so that the seat of the solid tire is a double cone of comparatively light taper, thus, when the clinches are pulled home by their bolts the tire is firmly gripped. In order to prevent the expansion of the tire under the pressure of the conical seating surfaces it is furnished with an inextensible steel band or bands 48 built into its substance or vulcanized thereto, just as is the common practice in the case of solid tires with a parallel seating.

Having now described my invention, what I claim as new and desire to secure by Letters Patent is:—

1. In a radially and laterally resilient wheel, a pneumatic sub-tire, a peripheral tire proper, a floating rim between the said tires comprising two side members provided with clinches for the outer edges of the sub-tire and adapted to position and hold the tire proper, a packing ring in the middle plane of the wheel between the two side members and provided with counter clinches for the outer edges of the sub-tire, and bolts passing transversely through the three said parts for fastening them in fixed relationship.

2. In a radially and laterally resilient wheel, a pneumatic sub-tire, a pneumatic tire proper, a floating rim between the said tires comprising two side members provided with clinches for the outer edges of the sub-tire, a packing ring in the middle plane of the wheel between the two side members and provided with counter clinches for the outer edges of the sub-tire, bolts passing transversely through the three said parts for fastening them in fixed relationship, and clinches carried by the side members to locate and hold the inner margins of the tire proper.

3. In a wheel of the kind defined in claim 1, boxes on the packing ring adapted to receive a valve lug, and anchorage lugs protruding radially from the inner tubes of the sub-tire and tire proper.

4. In a wheel of the kind defined in claim 2, boxes on the packing ring adapted to receive a valve lug, and anchorage lugs protruding radially from the inner tubes of the tub-tire and tire proper.

5. A wheel of the kind defined in claim 1 having a peripheral pneumatic tire proper in which one of the side members of the floating ring is made in two rings overlapping radially, the clinch for the pneumatic tire proper being integral with the laterally outer ring, the bolt holes in said outer ring being larger than the nuts, and washers provided to bridge the large holes and afford seatings for the nuts whereby the nuts can be unscrewed one by one, their washers removed, the nuts screwed up to seat against the laterally inner ring, and the outer ring finally removed from the floating rim, thereby giving access to the tire proper without unfastening the sub-tire.

6. A wheel of the kind defined in claim 1 comprising a sleeve having a clinch integral at one end thereof adapted to be detachably fastened to the hub, a loose clinch at the other end of the sleeve, a tubular distance piece with counter-clinches at each end, and clamping means for securing said parts and inner margins of the sub-tire cheeks in fixed relationship.

In testimony whereof I have signed my name to this specification.

FREDERICK WILLIAM LANCHESTER.